UNITED STATES PATENT OFFICE.

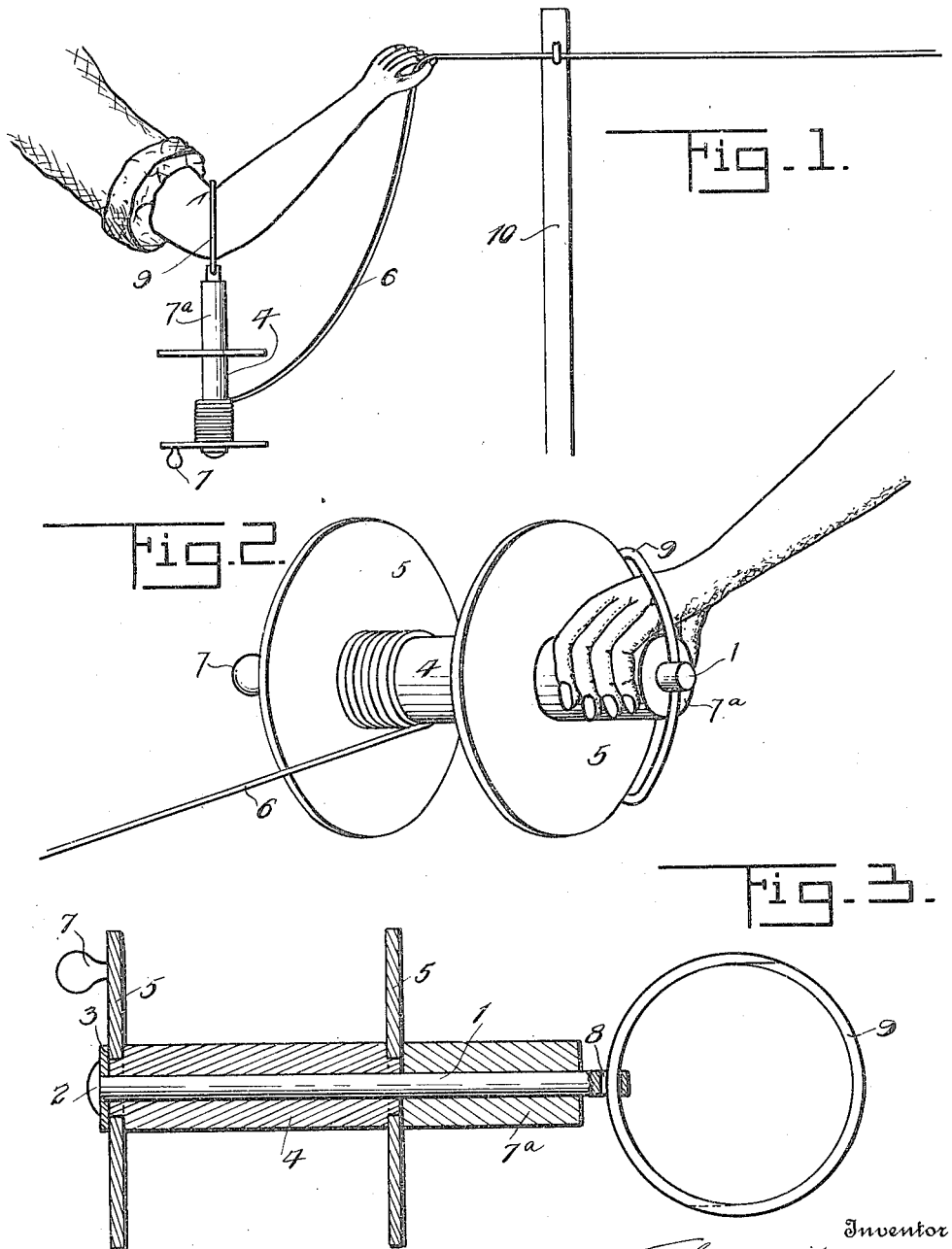

THEODOR SCHWALBACH, OF MILWAUKEE, WISCONSIN.

CLOTHES-LINE REEL.

1,128,063.   Specification of Letters Patent.   Patented Feb. 9, 1915.

Application filed December 8, 1913. Serial No. 805,408.

*To all whom it may concern:*

Be it known that I, THEODOR SCHWALBACH, a citizen of the United States, residing at Milwaukee, in the county of Milwaukee and State of Wisconsin, have invented certain new and useful Improvements in Clothes-Line Reels, of which the following is a specification.

The present invention relates to improvements in clothes line reel especially constructed for the coöperation with the arm of the operator so as to facilitate the winding and unwinding of the line carried thereby in such a manner as to prevent likelihood of entanglement or soiling of the same through accidental contact with the ground.

To the end of accomplishing the foregoing object, the invention comprises an arm supporting member by means of which the device may be suspended from the operator's arm while the hands are free to properly handle the clothes line, said member having pivotal connection with the device whereby it may be moved into proper relation with the handle to enable the operator to grasp the same without removal of the supporting member from the arm.

With the above and other objects in view, this invention consists in the construction, combination and arrangement of parts all as hereinafter more fully described, claimed and illustrated in the accompanying drawings, wherein:

Figure 1 is a view in elevation of my device shown in suspended position on the arm of the operator and illustrating the manipulation of the clothes line in unwinding action from the device. Fig. 2 is a perspective view showing the position of the arm supporting member with respect to the handle during the winding of the line upon the reel. Fig. 3 is a longitudinal sectional view showing more clearly the details of construction.

Throughout the following detail description, and on the several figures of the drawing, similar parts are referred to by like reference characters.

Specifically describing my invention and referring to the drawing, the numeral 1 designates a rod or shaft having a head 2 at one end and a washer 3 contiguous thereto. Upon the shaft 1 is loosely mounted the reel or spool proper which is composed of the body portion 4 of cylindrical form and having its ends reduced to permit the connection of the guide disks or flanges 5 therewith. The spool is adapted to receive the clothes line 6 which is wound thereupon between the spaced disks 5 in the customary manner, a handle or projecting knob 7 being secured to the end of the spool adjacent the periphery of the guiding flange as shown most clearly in Fig. 3 of the drawing. The spool aforesaid is held in position upon the shaft or rod 1 by a handle 7ª preferably of the size and shape of the body 4 of the spool, said handle 7ª being fixedly mounted upon the shaft to prevent longitudinal movement of the spool with respect to the latter. The extremity of the shaft 1 projects a short distance beyond the handle 7ª and is provided with a transverse opening 8 through which a supporting member 9 is passed for pivotal connection with the shaft. Preferably the supporting member 9 comprises a broken or openable ring of a sufficient size to permit the arm of the operator to be inserted thereinto.

The important feature of this invention is the ring and its particular connection with the shaft as hereinbefore described which will permit the suspension of the reel device from the operator's arm as shown in Fig. 1 of the drawing when it is desired to unwind therefrom the clothes line 6, in the actual use of the latter. From this figure it will be obvious that the hands of the operator are perfectly free to connect or attach the line 6 to its usual supporting post or like support 10, and the line is fed out from the reel by the movement of the operator in thus hanging the line. In this way the line unwinds from the reel only as it is needed, and any likelihood of the same becoming soiled by contacting with the ground as is often the case under usual conditions of hanging a clothesline is eliminated. When the line has been properly hung the ring 9 is removed from the arm and the device hung upon the post or a nearby nail as the case may be by means of the ring until it is desired to take down the line from its supports. When it is desired to perform the last-mentioned operation, the device is suspended from the arm of the operator, as hereinbefore described, and the ring permitted to slip downwardly and to move on its pivot into proper relation with the handle 7ª so that the operator may grasp the latter as shown in Fig. 2 whereupon through the instrumentality of the knob 7 the line may be wound upon the spool and during such winding action the hands of the operator may be freed temporarily, if necessary, by merely dropping the same and permitting the ring to slide back upon the arm in an obvious manner.

It will be apparent that the invention may be easily and cheaply manufactured, and made in different shapes and sizes for performing the functions hereinbefore set forth.

Having thus described the invention, what I claim as new is:

A clothes line reel comprising a rotatable spool, a shaft upon which said spool is loosely mounted, a handle fixedly secured to said shaft and impinging against the spool to prevent longitudinal movement of the same on said shaft, and an arm supporting ring pivoted to the shaft in juxtaposed relation to the handle whereby to suspend the reel during unwinding of the line therefrom, said shaft having an aperture therethrough in which the ring is disposed.

In testimony whereof I affix my signature in presence of two witnesses.

THEODOR SCHWALBACH.

Witnesses:
SUSIE SCHUH,
CHAS. HOLZHAUER.

Copies of this patent may be obtained for five cents each, by addressing the "Commissioner of Patents, Washington, D. C."